United States Patent Office 3,698,894
Patented Oct. 17, 1972

3,698,894
PHOTOCONDUCTIVE TITANIUM DIOXIDE
MATERIAL
Warren M. Foss, Metuchen, N.J., assignor to NL
Industries, Inc., New York, N.Y.
No Drawing. Filed Aug. 20, 1970, Ser. No. 65,724
Int. Cl. C03g 5/00, 7/00
U.S. Cl. 96—1.5
4 Claims

ABSTRACT OF THE DISCLOSURE

A new type of photoconductive anatase titanium dioxide composition has been produced which comprises euhedral shaped titanium dioxide particles having an average individual crystal size from 0.2 to 5.0 microns, the surface of said crystals containing a dense coating of zinc oxide in amount from 1% to 4% and containing from 0% to 1% of a dense coating of lead oxide, the percentages based on the weight of the titanium dioxide.

BACKGROUND OF THE INVENTION

Many types of photoconductive pigments have been produced by the prior art. The instant invention is concerned with the preparation of photoconductive titanium dioxide pigments. In application Ser. No. 1,529 filed Jan. 8, 1970, now U.S. Pat. No. 3,632,527, a process is described for producing a new type of photoconductive $TiO_2$ material which may or may not contain loosely adhering coatings of $Al_2O_3$, $SiO_2$, ZnO, PbO and $TiO_2$.

The $TiO_2$ material itself is described in U.S. Pat. No. 3,632,527 and consists of euhedral shaped crystals having an average crystal size of 0.2 to 5.0 microns. Although this material possesses a high degree of photoconductivity when incorporated in a paper system, whether the $TiO_2$ particles are coated or not, the photoconductivity is increased if the particular type of dense, firmly adherent zinc oxide coating of the instant invention is formed on the surface of the euhedral $TiO_2$ particles. In some instances the photoconductive properties may be still further enhanced if a dense coating of lead oxide is also applied.

SUMMARY OF THE INVENTION

The photoconductive product of the instant invention consists of euhedral shaped crystals of anatase titanium dioxide having an average particle size of 0.2 to 5.0 microns, the surface of said particles having a firmly adherent, dense coating of zinc oxide in amount from 1% to 4% and containing in addition, if desired, a dense coating of lead oxides in amount from 0% to 1%.

Basically the euhedral shaped crystals of $TiO_2$ are prepared using the process described in U.S. Pat. No. 3,632,-527 and the crystals are coated in the following manner.

The $TiO_2$ particles after ball-milling are slurried in water and the slurry is heated to 60° C. To the heated slurry is added an alkali metal hydroxide until the pH is raised to 10-11. A solution of a zinc salt, such as e.g. zinc sulfate, is then added over a period of 15-30 minutes and the pH is held above 10. If desired the lead oxide coating is also applied by adding a soluble lead salt, such as e.g. lead nitrate, at the same pH.

After holding the mixture for at least 30 minutes at a pH of at least 10, the pH is lowered slowly to pH of 7.5 in an orderly fashion over a period of one hour. The product is then filtered and washed well with water. After drying at 110-120° C., the product is then thoroughly milled.

DESCRIPTION OF THE PREFERRED EMBODIMENT

The $TiO_2$ base composition used in the instant invention is prepared by the process described in U.S. Pat. No. 3,632,527 which comprises hydrolyzing a titanium sulfate-iron sulfate solution to form a titania hydrate, filtering, bleaching and washing said hydrate to remove the soluble iron salts therefrom. The bleached hydrate is substantially iron-free but contains from 5% to 15% $H_2SO_4$ associated with said hydrate. The hydrate is slurried and treated with a sufficient amount of an ammoniacal agent selected from the group consisting of ammonia, ammonium hydroxide and ammonium carbonate to neutralize the titania hydrate slurry to a pH of 5.0 to 11.0. The neutralized titania hydrate contains an amount of sulfate no greater than 2% $SO_3$ in said hydrate, calculated on a $TiO_2$ basis. The washed titania hydrate is treated with an alkali metal salt selected from the group consisting of sodium chloride, sodium sulfate, sodium pyrosulfate, sodium hydroxide, sodium carbonate, potassium chloride, potassium sulfate, potassium pyrosulfate, potassium hydroxide and potassium carbonate. The amount of sodium compound added, calculated as $Na_2O$, is from 0.4% to 2.0%, while the amount of potassium compound added, calculated as $K_2O$, is from 0.4% to 3.0%. The hydrate should contain no more than 0.1% $P_2O_5$ on a $TiO_2$ basis. The treated hydrate is then calcined at a temperature from 900° C. to 1025° C. for hydrates containing $K_2O$ and 875° C. to 925° C. for hydrates containing $Na_2O$ to develop the highly crystalline anatase titanium dioxide euhedral material. The calcined material is then ground and the ground material has an average individual crystal size of from 0.2 to 5.0 microns. The size of the individual crystals are about 0.2 micron when the $K_2O$ treated hydrate is calcined at 900° C. This size increases however to about 0.7 micron when the calcination temperature is raised to 1000° C.

Using $Na_2O$ as the treating agent, the titanium dioxide crystals have the anatase structure when calcined at about 875–925° C. with the crystal size of about 0.25–0.5 micron.

The use of potassium salts is preferred over sodium salts since it is easier to maintain the crystal structure of anatase using potassium salts. Potassium sulfate is particularly desirable to employ since its use reduces the amount of potassium titanate formed. It is desirable to maintain the amount of potassium titanate formation to less than 2%. The rutile content preferably should also be held below 10%.

In the previously described patent application Ser. No. 1,529 the euhedral $TiO_2$ particles may or may not be coated with a metal oxide coating of $Al_2O_3$, $SiO_2$, ZnO, PbO or $TiO_2$. This coating is formed on the surface of the $TiO_2$ particles as a loosely adhering coating. It is formed by adding an aqueous solution of an acid salt of the metal compound to a slurry of the $TiO_2$ and the metal oxide is formed by reacting the acid salt of the metal compound with an alkali (e.g. NaOH) which precipitates the metal oxide compound onto the surface of the $TiO_2$ particles. The pH of the final slurry is about 7.0.

In contrast to the previously described process in U.S. Pat. No. 3,632,527 the euhedral $TiO_2$ particles in the instant invention are coated in a different manner with ZnO and PbO and therefore a firmly adherent and dense coating of ZnO and PbO is formed on the surface of the $TiO_2$ particles. The instant coating process may be described as follows:

(1) a ball-milled slurry of euhedral $TiO_2$ particles are heated to 60 to 90° C. and the pH is adjusted to at least 10 to 11 by adding an alkali metal compound, e.g. NaOH;

(2) a zinc salt, e.g. $ZnSO_4$, is then added as an aqueous solution to the $TiO_2$ slurry over a period of at least 15 minutes while the pH is held above 10.0;
(3) after the zinc salt has been added a lead solution may then be added if desired;
(4) the mixture was then held for at least 30 minutes at a pH of at least 10;
(5) after all of the metal salts had been added the pH was lowered at the rate of 0.5 pH units per 10 minute intervals to pH of 7.5 by adding dilute $H_2SO_4$ to the mixture.

After coating the product is filtered, washed, dried and ground thoroughly.

The final products are tested for photoconductivity as follows:

TESTS FOR PHOTOCONDUCTIVITY

The titanium dioxide material is dispersed in a solution of methyl methacrylate copolymer made by E. I. du Pont Company and sold under the name of Elvacite 6014. To the mixture is added 0.02% fluorescein from a methanol solution.

25.0 grams of the titanium dioxide material are dispersed in 62.5 mls. of a solution of the copolymer (100 grams copolymer solution diluted to 1000 ml. with toluene) by mixing in a high speed blender for 5 minutes. The mixture is then applied to an aluminum sheet 0.0015 inch thick with a Bird film applicator (gap width 0.003 inch, wet film thickness of about 0.0015 inch) to give a coating weight of about 13 pounds per 3000 sq. ft. per ream. The film is then over-dried at 50° C. for one minute.

A small piece of the coated foil is then dark-adapted overnight and tested in the dynamic-capacitor electrometer where its electro-photographic properties are measured as follows:

1—charge acceptance
2—dark decay
3—light decay

The dynamic-capacitor electrometer used is similar to the apparatus described in R.C.A. Review, 22, 780–90 (1961), except that the one square inch samples are mounted on the rim of the nine inch diameter wheel (30 in. circumference) so that the true charging time and light exposure times are each 1/30 the nominal time in the cycle. The negative corona is operated at −7000 volts. The probe voltages are followed with a strip chart recorder. The light source is a 500 watt tungsten-iodine filament lamp mounted 8 inches from the edge of the rim with a 10% neutral density filter to reduce the light intensity to about 25 foot-candles at the specimen. The cycle arbitrarily selected for the test involves 10.0 seconds (nominal) of charging, 5.0 seconds of dark decay and the light exposure is continued to allow the surface voltage to decay below 40 volts.

For a titanium dioxide material to be acceptable for the copy paper industry the charge acceptance should be at least 300 volts within a ten-second period, the dark decay less than 60% of the charge acceptance, the light decay at least 70 volts per second and it should have a residual of no more than 40 volts. Typically an acceptable film shows a charge acceptance of 320 volts, a dark decay of 20 volts per second, a light decay of 70 volts per second.

The product produced is then further tested for useful photoconductivity by actually preparing a print on a test film in a commercial copier. For this test, the pigmented copolymer film prepared as described above and coated either on a 3 mil. aluminum foil or a commercially available conductive paper, is dark-adapted overnight and used to make a single page copy on a commercially available copier. For this purpose a Model 33 Electrostatic Copier manufactured by the SCM Corporation is used. A useful photoconductive film will yield a high contrast, clear and sharp copy with a light background and little or on streaking, stemming from inhomogeneous corona charging of the test film, in the direction of motion of the film through the machine.

The following examples are presented in order to describe the instant invention in more detail:

EXAMPLE 1

Euhedral $TiO_2$ particles were prepared as follows:

3600 mls. of a titanium sulfate-iron sulfate solution containing 250 g.p.l. $TiO_2$, 169 g.p.l. $FeSO_4$ and 500 g.p.l. $H_2SO_4$ were heated to 96° C. and were added within a period of 16 minutes to 900 mls. water heated to 96° C. The entire mixture was heated to boiling and boiled for 3 hours to complete the hydrolysis. 950 mls. of hot water were added to the mixture to cut the concentration to 165 g.p.l. $TiO_2$ The hydrate was filtered, washed free from soluble iron salts, bleached with 10% $H_2SO_4$ and 0.1% aluminum metal for 1 hour at 80° C. at 20% solids, then filtered and washed with water until iron free. The washed filter cake contained 10% $H_2SO_4$ on a $TiO_2$ basis. 2570 grams of the filter cake containing 35% solids were admixed with 1500 mls. water to form a slurry containing 22% solids. With agitation, 31.5 grams of ammonia, added as a solution in water, were added to the hydrate slurry to neutralize substantially all of the sulfuric acid present in the hydrate. The pH of the neutralized hydrate was 7.5. The neutralized hydrate was heated at 60° C. for 1 hour and the pH readjusted with ammonia to a pH of 7.5.

The neutralized solids were then allowed to settle and the solids content were washed with 70 liters of water containing 5 g.p.l. $NH_4Cl$. The washed titania hydrate contained 0.18% sulfate calculated as $SO_3$ and 0.07% $P_2O_5$ on a $TiO_2$ basis.

The washed titania hydrate was then treated with KOH, calculated at 1.25% $K_2O$ on a $TiO_2$ basis, and the treated hydrate was then rotary calcined at 990° C. for 3 hours to produce a highly crystalline anatase titanium dioxide material. The calcined material contained 1.25% $K_2O$, 0.07% $P_2O_3$ and the individual crystals of the $TiO_2$ were euhedral with a major portion of the crystal edges being straight-sided. The average individual crystal size was 0.7 micron.

These euhedral $TiO_2$ particles were then coated as follows:

(1) 150 pounds of the euhedral $TiO_2$ crystals described above were admixed with water to form a slurry containing 33% solids; 0.2% of a dipsersing agent, such as monoisopropanolamine, were added to the slurry and the slurry was heated to 60° C.;
(2) to the heated slurry were added a 25% solution of sodium hydroxide to raise the pH to 10.5 after which another 2.5% additional NaOH ($TiO_2$ basis) were added;
(3) after holding for 15 minutes, 27.0 liters of $ZnSO_4$ solution containing 100 g.p.l. $ZnSO_4$ were added over a period of 20 minutes. This amount of $ZnSO_4$ is equal to 2% ZnO on a $TiO_2$ weight basis. The pH of the solution was maintained at pH of 10.5 during the addition period;
(4) after all of the $ZnSO_4$ has been added the slurry was maintained at pH of 10.5 and 60° C. for 30 minutes;
(5) a 10% $H_2SO_4$ solution was added to lower the pH to 10.0. The slurry was maintained at this pH for 10 minutes;
(6) the pH of the slurry was then lowered 0.5 pH at 10 minute intervals until the pH of the slurry reached 7.5;
(7) after holding at pH of 7.5 for 1 hour the slurry was filtered and the cake washed with $H_2O$ until sulfate free;
(8) the washed filter cake was then dried and micropulverized.

The ground product has the following photoconductive properties:

Charge acceptance _____ 364
Dark decay _____ 23
Light decay _____ 100

EXAMPLES 2–3

In these examples the euhedral $TiO_2$ produced in Example 1 was coated with 1% and 0.5% ZnO using the procedure described in U.S. Pat. No. 3,632,527 wherein the $TiO_2$ slurry is treated with zinc sulfate and neutralized with NaOH to a pH of 7.5. The zinc oxide values are precipitated onto the surface of the $TiO_2$. The coating is not firmly adherent nor dense.

The photoconductive properties of these examples are recorded in the following table along with those of Example 1.

EXAMPLE 4

In this example the euhedral $TiO_2$ particles were coated in the same manner as that described in Example 1 except after Step 3, 5.05 liters of lead nitrate solution containing 100 g.p.l. PbO were also added after the $ZnSO_4$ addition. The amount of lead nitrate added was equal to 0.5% PbO on a $TiO_2$ basis. The ZnO amount remained at 2.0%. The coated $TiO_2$ was further processed in the same manner as Example 1 and the ground product was tested for photoconductivity. The results are also recorded in the following table.

EXAMPLES 5–8

In these runs the procedure of Example 1 was repeated except that the amount of zinc oxide coating was varied from 1.0% to 4.0%. The photoconductivity results are recorded in the table.

TABLE

| | Examples | | | | | | | |
|---|---|---|---|---|---|---|---|---|
| | 1 | 2 | 3 | 4 | 5 | 6 | 7 | 8 |
| ZnO, percent | 2.0 | 1.0 | 0.5 | 2.0 | 1.0 | 2.0 | 3.0 | 4.0 |
| PbO, percent | | | | 0.5 | | | | |
| Photoconductivity: | | | | | | | | |
| Charge acceptance | 364 | 420 | 384 | 344 | 328 | 388 | 348 | 340 |
| Dark decay | 23 | 20 | 20 | 21 | 21 | 29 | 29 | 27 |
| Light decay | 100 | 74 | 76 | 125 | 102 | 111 | 107 | 98 |
| Type of coating | Dense, firmly adherent | Fluffy, loosely adherent | Fluffy, loosely adherent | Dense, firmly adherent | Dense, firmly adherent | Dense, firmly adherent | Dense, firmly adherent | Dense, firmly adherent |

It has clearly been shown by the table that the dense adherent coating of ZnO formed by the process of the instant invention onto the surface of the euhedral $TiO_2$ particles produces superior photoconductivity to that produced by the process described in U.S. Pat. No. 3,632,527 which forms a loosely adhering ZnO coating.

While this invention has been described and illustrated by the examples shown, it is not intended to be strictly limited thereto, and other variations and modifications may be employed within the scope of the following claims.

I claim:

1. Composition of matter consisting essentially of euhedral titanium dioxide crystals, a majority of the edges of said crystals being straight-sided, said crystals having an average individual crystal size of from 0.2 to 5.0 microns, said crystals having the crystal structure of anatase, said crystals being coated with a dense adherent coating of zinc oxide, the amount of zinc oxide coating being from 1.0% to 4.0%, the percentages based on the weight of said titanium dioxide, said composition prepared by forming an aqueous slurry of euhedral $TiO_2$ particles, heating the slurry from 60° C. to 90° C., adjusting the pH of the slurry to at least 10 by adding an alkali metal compound, adding a soluble zinc salt to said aqueous slurry over a period of at least 15 minutes while maintaining the pH to at least 10, holding the mixture for at least 30 minutes at a pH of at least 10, then lowering the pH at a rate of no more than 0.5 pH unit per 10 minute intervals by adding an acid until the pH is lowered to at least 7.5, then filtering, washing and drying said coated product, thus forming said dense adherent zinc oxide coating on said euhedral titanium dioxide crystals.

2. Composition of matter consisting essentially of euhedral titanium dioxide crystals, a majority of the edges of said crystals being straight-sided, said crystals having an average individual crystal size of from 0.2 to 5.0 microns, said crystals having the crystal structure of anatase, said crystals being coated with a dense adherent coating of zinc oxide and in addition coated with a dense adherent coating of lead oxide, the amount of zinc oxide coating being from 1.0% to 4.0%, and the amount of lead oxide coating being from 0.0% to 1.0%, the percentages based on the weight of said titanium dioxide, said composition prepared by forming an aqueous slurry of euhedral $TiO_2$ particles, heating the slurry to at least 10 by adding an alkali metal compound, adding a soluble zinc salt to said aqueous slurry over a period of at least 15 minutes while maintaining the pH to at least 10, adding a soluble lead salt to said aqueous slurry over a period of at least 15 minutes while maintaining the pH to at least 10, holding the mixture for at least 30 minutes at a pH of at least 10, then lowering the pH at a rate of no more than 0.5 pH units per 10 minute intervals by adding an acid until the pH is lowered to at least 7.5, then filtering, washing and drying said coated product, thus forming said dense adherent coatings of zinc oxide and lead oxide on said euhedral titanium dioxide crystals.

3. Method for producing a new photoconductive composition of matter consisting essentially of euhedral titanium dioxide anatase crystals, said crystals containing an adherent dense coating of zinc oxide, said process which comprises forming an aqueous slurry of euhedral $TiO_2$ particles, heating the slurry from 60° C. to 90° C., adjusting the pH of the slurry to at least 10 by adding an alkali metal compound, adding a soluble zinc salt to said aqueous slurry over a period of at least 15 minutes while maintaining the pH to at least 10, the amount of said zinc salt being from 1.0% to 4.0% calculated as zinc oxide and based on the weight of said titanium dioxide, holding the mixture for at least 30 minutes at a pH of at least 10, then lowering the pH at a rate of no more than 0.5 pH unit per 10 minute intervals by adding an acid until the pH is lowered to at least 7.5, then filtering, washing and drying said coated product.

4. Method for producing a new photoconductive composition of matter consisting essentially of euhedral titanium dioxide anatase crystals, said crystals containing an adherent dense coating of zinc oxide, and in addition an adherent dense coating of lead oxide, said process which comprises forming an aqueous slurry of euhedral $TiO_2$ particles, heating the slurry from 60° C. to 90° C., adjusting the pH of the slurry to at least 10 by adding an alkali metal compound, adding a soluble zinc salt to said aqueous slurry over a period of at least 15 minutes while maintaining the pH to at least 10, adding a soluble lead salt to said aqueous slurry over a period of at least 15 minutes while maintaining the pH to at least 10, the amount of said zinc salt being from 1.0% to 4.0% calculated as zinc oxide and based on the weight of said titanium dioxide, and the amount of said lead salt being from 0.0% to 1.0% calculated as lead oxide and based on the weight of said titanium dioxide, holding the mixture for at least 30 minutes at a pH of at least 10, then lowering the pH at a rate of no more than 0.5 pH unit per 10 minute intervals by adding an acid until the pH is lowered to at least 7.5, then filtering, washing and drying said coated product.

References Cited

UNITED STATES PATENTS 3,561,968   2/1971   Dantro _____ 96—88

FOREIGN PATENTS 567,934   3/1945   Great Britain.

GEORGE F. LESMES, Primary Examiner

M. B. WITTENBERG, Assistant Examiner

U.S. Cl. X.R.

96—1.8; 252—501; 106—296, 300